US006976048B2

(12) United States Patent
Walster et al.

(10) Patent No.: US 6,976,048 B2
(45) Date of Patent: Dec. 13, 2005

(54) METHOD AND APPARATUS SOLVING PROBLEMS HAVING INTERVAL PARAMETERS

(75) Inventors: G. William Walster, Cupertino, CA (US); Eldon R. Hansen, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 556 days.

(21) Appl. No.: 10/095,184

(22) Filed: Mar. 11, 2002

(65) Prior Publication Data

US 2003/0172095 A1 Sep. 11, 2003

(51) Int. Cl.$^7$ .............................. G06F 7/38; G06F 7/00
(52) U.S. Cl. ..................................... 708/446; 708/200
(58) Field of Search ............................... 708/200, 103, 708/446

(56) References Cited

OTHER PUBLICATIONS

Nicola Femia, A Robust and Fast Convergent Interval Analysis Method for the Calculation of INternally Controlled Switching Instants, Mar. 1996, IEEE, pp. 191-199.*
E.R. Hansen, "Global Optimization Using Interval Analysis," Marcel Dekker, Inc., New York, NY, 1992.
R.B. Kearfott, "A Fortran 90 Environment for Research and Prototyping of Enclosure Algorithms for Nonlinear Equations and Global Optimization," ACM Transactions on Mathematical Software, vol. 21, No. 1, Mar. 1995, pp. 63-78 http://interval.louisiana.edu/preprints.html.
R. B. Kearfott, Algorithm 763: Interval Arithmetic: A Fortran 90 Module for an Interval Data Type, ACM Trans. Math. Software, 22, vol. 4, 1996, pp. 385-392. http://interval.louisiana.edu/preprints.html.

R. B. Kearfott and M. Novoa III, "Algorithm 681: INTBIS, A portable interval Newton/bisection package", ACM Trans. Math Software, vol. 16, No. 2, pp. 152-147. http://www.netlib.org/toms/681.
R. B. Kearfott, M. Dawande, K.S. Du, and C. Hu, "Algorithm 77: INTLIB: A Portable Fortran 77 Interval Standard Function Library," ACM Trans. Math. Software, 20, vol. 4, Dec. 1994, pp. 447-458.
R. B. Kearfott and G.W. Walster, "On Stopping Criteria in Verified Nonlinear Systems or Optimization Algorithms," ACM Trans. Math. Software, 26, vol. 3, Sep. 2000, pp. 323-351. The publication itself says Received: Jul. 1999; revised: Mar. 2000; accepted: Mar. 2000. http://interval.louisiana.edu/preprints.html.
R.E. Moore and S.T. Jones "Safe Starting Regions for Iterative Methods", SIAM Journal on Numerical Analysis, vol. 14, No. 6 (Dec. 1977), pp. 1051-1065.

(Continued)

*Primary Examiner*—Kakali Chaki
*Assistant Examiner*—Chat C. Do
(74) *Attorney, Agent, or Firm*—Park, Vaughan & Fleming, LLP

(57) ABSTRACT

One embodiment of the present invention provides a system that solves a problem involving an interval parameter p through an interval solution process. During operation, the system receives a representation of the problem, wherein the problem includes a number of variables $x_1, x_2, x_3, \ldots x_n$ and at least one interval parameter p. The system stores the representation in a computer memory, and then performs the interval solution process on the problem. During this interval solution process, the system splits the problem into sub-problems by splitting the interval parameter p into subintervals, and creating separate sub-problems for each subinterval. The system then performs the interval solution process on the sub-problems. By splitting the interval parameter p, the system can achieve a tighter bound on the solution set of the problem. The decision to split on any parameter p is made in exactly the same way it would be made if p were a variable of the problem. Otherwise, parameters are kept separate from problem variables.

24 Claims, 4 Drawing Sheets

OTHER PUBLICATIONS

A. Neumaier, "The Enclosure of Solutions of Parameter-Dependent Systems of Euqations," Cambridge University Press, Cambridge, 1990, ISBN: 0-12-505630-3, Reliability in Computing pp. 269-186.

S.M. Rump, "Verification Methods for Dense and Sparse Systems of Equations," in Topics in Validated Computations: Proceedings of the IMACS-GAMM International Workshop on Validated Computations, University of Oldenburg, J. Herzberger, ed., Elsevier Studies in Computational Methematics, Elsevier, 1994, pp. 63-136.

Pascal Van Hentenryck, Vijay Saraswat and Yves Deville, "Design, Implementation, and Evaluation of the Constraint Language cc (FD)," Elsevier Science, Inc., 1998.

* cited by examiner

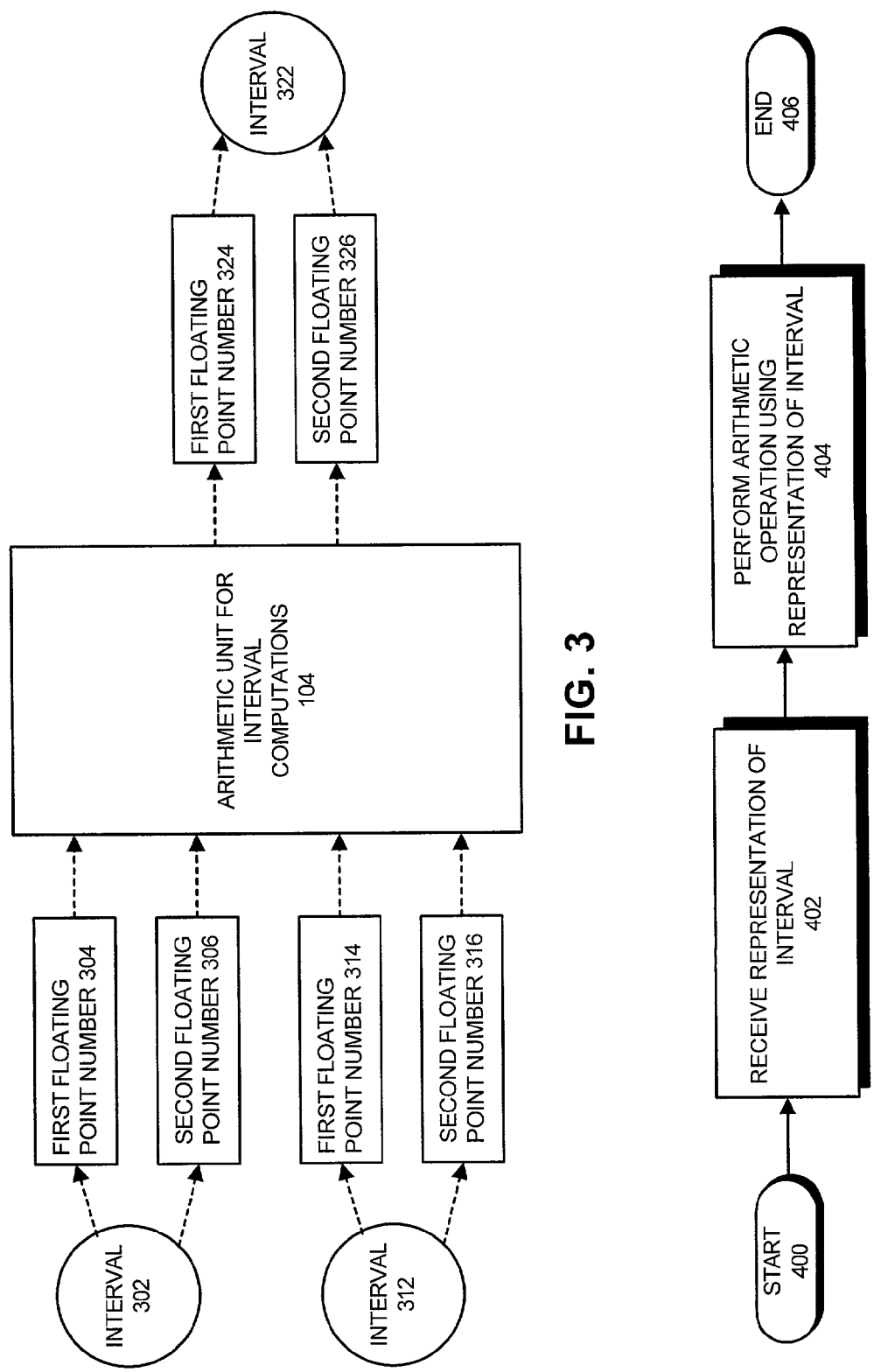

$$X \equiv [\underline{x}, \bar{x}] \equiv \{x \in \Re^* | \underline{x} \leq x \leq \bar{x}\}$$

$$Y \equiv [\underline{y}, \bar{y}] \equiv \{y \in \Re^* | \underline{y} \leq y \leq \bar{y}\}$$

(1) $X + Y = [\downarrow \underline{x} + \underline{y}, \uparrow \bar{x} + \bar{y}]$ (2) $X - Y = [\downarrow \underline{x} - \bar{y}, \uparrow \bar{x} - \underline{y}]$ (3) $X \times Y = [\min(\downarrow \underline{x} \times \underline{y}, \underline{x} \times \bar{y}, \bar{x} \times \underline{y}, \bar{x} \times \bar{y}), \max(\uparrow \underline{x} \times \underline{y}, \underline{x} \times \bar{y}, \bar{x} \times \underline{y}, \bar{x} \times \bar{y})]$ (4) $X/Y = [\min(\downarrow \underline{x}/\underline{y}, \underline{x}/\bar{y}, \bar{x}/\underline{y}, \bar{x}/\bar{y}), \max(\uparrow \underline{x}/\underline{y}, \underline{x}/\bar{y}, \bar{x}/\underline{y}, \bar{x}/\bar{y})], \text{ if } 0 \notin Y$ $X/Y \subseteq \Re^*, \text{ if } 0 \in Y$

FIG. 5

METHOD AND APPARATUS SOLVING PROBLEMS HAVING INTERVAL PARAMETERS

BACKGROUND

1. Field of the Invention

The present invention relates to performing arithmetic operations on interval operands within a computer system. More specifically, the present invention relates to a method and an apparatus for solving problems having interval parameters, such as global optimization problems or problems that involve solving systems of nonlinear equations.

2. Related Art

Rapid advances in computing technology make it possible to perform trillions of computational operations each second. This tremendous computational speed makes it practical to perform computationally intensive tasks as diverse as predicting the weather and optimizing the design of an aircraft engine. Such computational tasks are typically performed using machine-representable floating-point numbers to approximate values of real numbers. (For example, see the Institute of Electrical and Electronics Engineers (IEEE) standard 754 for binary floating-point numbers.)

In spite of their limitations, floating-point numbers are generally used to perform most computational tasks.

One limitation is that machine-representable floating-point numbers have a fixed-size word length, which limits their accuracy. Note that a floating-point number is typically encoded using a 32, 64 or 128-bit binary number, which means that there are only $2^{23}$, $2^{64}$ or $2^{128}$ possible symbols that can be used to specify a floating-point number. Hence, most real number values can only be approximated with a corresponding floating-point number. This creates estimation errors that can be magnified through even a few computations, thereby adversely affecting the accuracy of a computation.

A related limitation is that floating-point numbers contain no information about their accuracy. Most measured data values include some amount of error that arises from the measurement process itself. This error can often be quantified as an accuracy parameter, which can subsequently be used to determine the accuracy of a computation. However, floating-point numbers are not designed to keep track of accuracy information, whether from input data measurement errors or machine rounding errors. Hence, it is not possible to determine the accuracy of a computation by merely examining the floating-point number that results from the computation.

Interval arithmetic has been developed to solve the above-described problems. Interval arithmetic represents numbers as intervals specified by a first (left) endpoint and a second (right) endpoint. For example, the interval [a, b], where a<b, is a closed, bounded subset of the real numbers, R, which includes a and b as well as all real numbers between a and b. Arithmetic operations on interval operands (interval arithmetic) are defined so that interval results always contain the entire set of possible values. The result is a mathematical system for rigorously bounding numerical errors from all sources, including measurement data errors, machine rounding errors and their interactions. (Note that the first endpoint normally contains the "infimum", which is the largest number that is less than or equal to each of a given set of real numbers. Similarly, the second endpoint normally contains the "supremum", which is the smallest number that is greater than or equal to each of the given set of real numbers.)

In some problems, there may be uncertainty about the values of certain parameters. For example, there may be measured quantities of uncertain accuracy. A function $f$ may involve numbers that cannot be exactly expressed in the computer's number system. For example, the function $f$ may be expressed in terms of transcendental numbers such as $\pi$.

Any such parameters or numbers can be expressed as intervals that contain their true values and whose endpoints are machine-representable numbers. The "value" of the function $f(x)$ involving such intervals is itself an interval for any x. We must then ask: what do we mean by a solution to a given problem that involves or depends on non-degenerate interval parameters.

To answer this question it is sufficient to consider a particular problem involving a parameter p. Other problems are similar. Assume we know that p is contained in an interval P. We can write the problem as $f(x, P)=0$. We define the solution to this problem to be the set $S=\{x: f(x, p)=0\}$ for all $p \in P$.

For a given value of p, we expect the function $f$ to have a set of distinct zeros. As p varies over P, a given zero, say x*, "smears out" over an interval, say X*. Although the zeros of $f(x, P)$ are generally distinct for a single value of p, the smeared zeros can overlap. Furthermore, if P is a wide interval, there can be considerable uncertainty as the where the boundary of the solution set lies.

What is needed is a method and an apparatus for accurately bounding the solution set of a problem involving one or more interval parameters p.

SUMMARY

One embodiment of the present invention provides a system that solves a problem involving an interval parameter p through an interval solution process. During operation, the system receives a representation of the problem, wherein the problem includes a number of variables $x_1, x_2, x_3, \ldots x_n$ and at least one interval parameter p. The system stores the representation in a computer memory, and then performs the interval solution process on the problem. During this interval solution process, the system splits the problem into sub-problems by splitting the interval parameter p into subintervals, and creating separate sub-problems for each subinterval. The system then performs the interval solution process on the sub-problems. By splitting the interval parameter p, the system can achieve a tighter bound on the solution set of the problem. The decision to split on any parameter p is made in exactly the same way it would be made if p were a variable of the problem. Otherwise, parameters are kept separate from problem variables.

In a variation on this embodiment, the solution set of the problem is contained within a box X that includes interval components for each of the variables $x_1, x_2, x_3, \ldots x_n$. In this variation, splitting the problem into sub-problems can additionally involve splitting the box X into subboxes.

In a further variation, performing the interval solution process on the box X involves attempting to reduce the box X. If the box X is not sufficiently reduced, the system splits the problem into sub-problems by splitting the box X and/or splitting the interval parameter p.

In a further variation, performing the interval solution process involves performing the interval Newton method or solving a global optimization problem or other problem on the box X.

In a variation on this embodiment, performing the interval solution process involves taking derivatives with respect to the variables $x_1, x_2, x_3, \ldots x_n$, but not with respect to the interval parameter p.

In a variation on this embodiment, the system generates a solution set for the problem by forming a union of solutions of the sub-problems.

In a variation on this embodiment, performing the interval solution process on the sub-problems can additionally involve splitting the sub-problems.

In a variation on this embodiment, the problem is an interval global optimization problem.

In a variation on this embodiment, the problem involves solving a system of nonlinear equations.

BRIEF DESCRIPTION OF THE FIGURES

FIG. 3 illustrates an arithmetic unit for interval computations in accordance with an embodiment of the present invention.

FIG. 4 is a flow chart illustrating the process of performing an interval computation in accordance with an embodiment of the present invention.

FIG. 5 illustrates four different interval operations in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
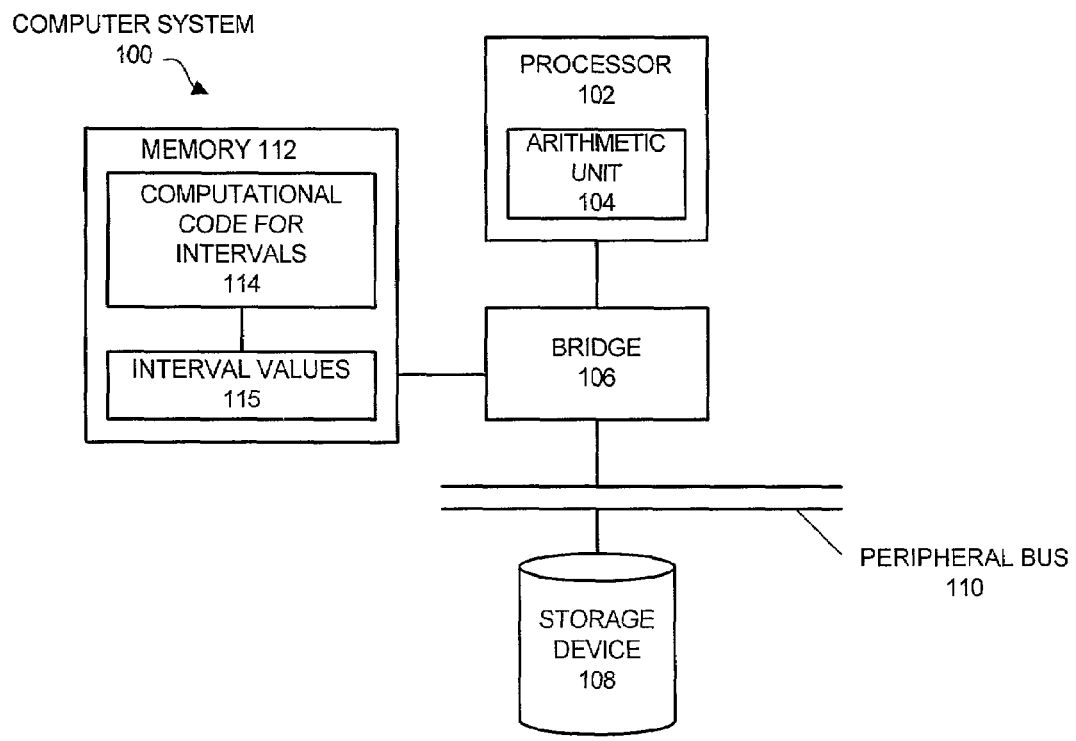
FIG. 1 illustrates a computer system in accordance with an embodiment of the present invention.

FIG. 1 illustrates a computer system 100 in accordance with an embodiment of the present invention. As illustrated in FIG. 1, computer system 100 includes processor 102, which is coupled to a memory 112 and a to peripheral bus 110 through bridge 106. Bridge 106 can generally include any type of circuitry for coupling components of computer system 100 together.

Processor 102 can include any type of processor, including, but not limited to, a microprocessor, a mainframe computer, a digital signal processor, a personal organizer, a device controller and a computational engine within an appliance. Processor 102 includes an arithmetic unit 104, which is capable of performing computational operations using floating-point numbers.

Processor 102 communicates with storage device 108 through bridge 106 and peripheral bus 110. Storage device 108 can include any type of non-volatile storage device that can be coupled to a computer system. This includes, but is not limited to, magnetic, optical, and magneto-optical storage devices, as well as storage devices based on flash memory and/or battery-backed up memory.

Processor 102 communicates with memory 112 through bridge 106. Memory 112 can include any type of memory that can store code and data for execution by processor 102. As illustrated in FIG. 1, memory 112 contains computational code for intervals 114. Computational code 114 contains instructions for the interval operations to be performed on individual operands, or interval values 115, which are also stored within memory 112. This computational code 114 and these interval values 115 are described in more detail below with reference to FIGS. 2–5.

Note that although the present invention is described in the context of computer system 100 illustrated in FIG. 1, the present invention can generally operate on any type of computing device that can perform computations involving floating-point numbers. Hence, the present invention is not limited to the computer system 100 illustrated in FIG. 1.

Compiling and Using Interval Code

Figure 2:
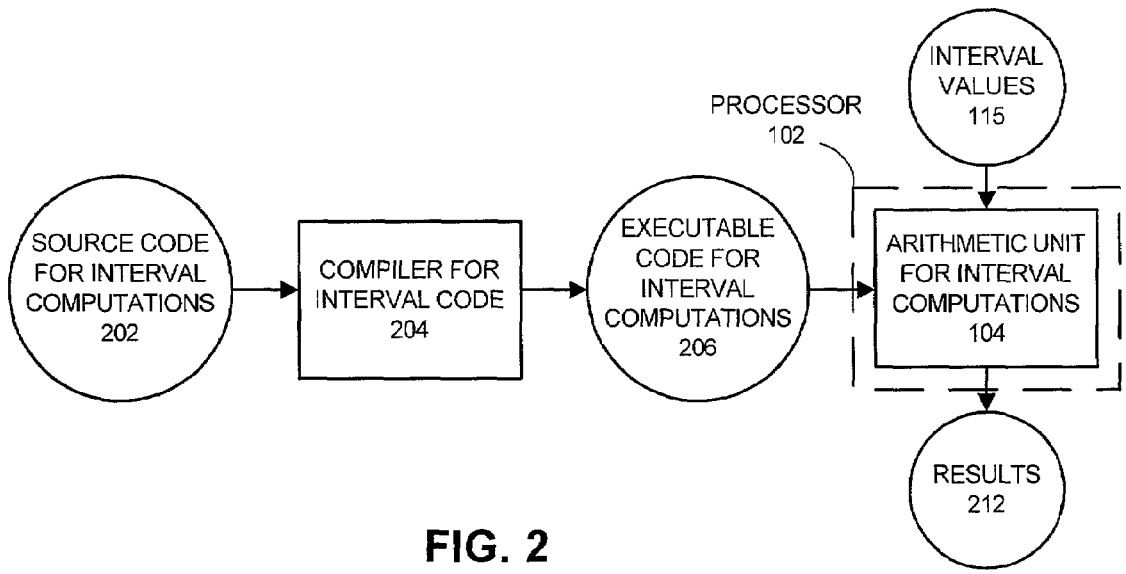
FIG. 2 illustrates the process of compiling and using code for interval computations in accordance with an embodiment of the present invention.

FIG. 2 illustrates the process of compiling and using code for interval computations in accordance with an embodiment of the present invention. The system starts with source code 202, which specifies a number of computational operations involving intervals. Source code 202 passes through compiler 204, which converts source code 202 into executable code form 206 for interval computations. Processor 102 retrieves executable code 206 and uses it to control the operation of arithmetic unit 104.

Processor 102 also retrieves interval values 115 from memory 112 and passes these interval values 115 through arithmetic unit 104 to produce results 212. Results 212 can also include interval values.

Note that the term "compilation" as used in this specification is to be construed broadly to include pre-compilation and just-in-time compilation, as well as use of an interpreter that interprets instructions at run-time. Hence, the term "compiler" as used in the specification and the claims refers to pre-compilers, just-in-time compilers and interpreters.

Arithmetic Unit for Intervals

FIG. 3 illustrates arithmetic unit 104 for interval computations in more detail accordance with an embodiment of the present invention. Details regarding the construction of such an arithmetic unit are well known in the art. For example, see U.S. Pat. Nos. 5,687,106 and 6,044,454, which are hereby incorporated by reference in order to provide details on the construction of such an arithmetic unit. Arithmetic unit 104 receives intervals 302 and 312 as inputs and produces interval 322 as an output.

In the embodiment illustrated in FIG. 3, interval 302 includes a first floating-point number 304 representing a first endpoint of interval 302, and a second floating-point number 306 representing a second endpoint of interval 302. Similarly, interval 312 includes a first floating-point number 314 representing a first endpoint of interval 312, and a second floating-point number 316 representing a second endpoint of interval 312. Also, the resulting interval 322 includes a first floating-point number 324 representing a first endpoint of interval 322, and a second floating-point number 326 representing a second endpoint of interval 322.

Note that arithmetic unit 104 includes circuitry for performing the interval operations that are outlined in FIG. 5. This circuitry enables the interval operations to be performed efficiently.

However, note that the present invention can also be applied to computing devices that do not include special-purpose hardware for performing interval operations. In such computing devices, compiler 204 converts interval operations into a executable code that can be executed using standard computational hardware that is not specially designed for interval operations.

FIG. 4 is a flow chart illustrating the process of performing an interval computation in accordance with an embodiment of the present invention. The system starts by receiving a representation of an interval, such as first floating-point number 304 and second floating-point number 306 (step 402). Next, the system performs an arithmetic operation using the representation of the interval to produce a result (step 404). The possibilities for this arithmetic operation are described in more detail below with reference to FIG. 5.

Interval Operations

FIG. 5 illustrates four different interval operations in accordance with an embodiment of the present invention. These interval operations operate on the intervals X and Y. The interval X includes two endpoints, x denotes the lower bound of X, and x̄ denotes the upper bound of X.

The interval X is a closed subset of the extended (including −∞ and +∞) real numbers R* (see line 1 of FIG. 5). Similarly the interval Y also has two endpoints and is a closed subset of the extended real numbers R* (see line 2 of FIG. 5).

Note that an interval is a point or degenerate interval if X=[x, x]. Also note that the left endpoint of an interior interval is always less than or equal to the right endpoint. The set of extended real numbers, R* is the set of real numbers, R, extended with the two ideal points negative infinity and positive infinity:

$$R^*=R\cup\{-\infty\}\cup\{+\infty\}.$$

In the equations that appear in FIG. 5, the up arrows and down arrows indicate the direction of rounding in the next and subsequent operations. Directed rounding (up or down) is applied if the result of a floating-point operation is not machine-representable.

The addition operation X+Y adds the left endpoint of X to the left endpoint of Y and rounds down to the nearest floating-point number to produce a resulting left endpoint, and adds the right endpoint of X to the right endpoint of Y and rounds up to the nearest floating-point number to produce a resulting right endpoint.

Similarly, the subtraction operation X−Y subtracts the right endpoint of Y from the left endpoint of X and rounds down to produce a resulting left endpoint, and subtracts the left endpoint of Y from the right endpoint of X and rounds up to produce a resulting right endpoint.

The multiplication operation selects the minimum value of four different terms (rounded down) to produce the resulting left endpoint. These terms are: the left endpoint of X multiplied by the left endpoint of Y; the left endpoint of X multiplied by the right endpoint of Y; the right endpoint of X multiplied by the left endpoint of Y; and the right endpoint of X multiplied by the right endpoint of Y. This multiplication operation additionally selects the maximum of the same four terms (rounded up) to produce the resulting right endpoint.

Similarly, the division operation selects the minimum of four different terms (rounded down) to produce the resulting left endpoint. These terms are: the left endpoint of X divided by the left endpoint of Y; the left endpoint of X divided by the right endpoint of Y; the right endpoint of X divided by the left endpoint of Y; and the right endpoint of X divided by the right endpoint of Y. This division operation additionally selects the maximum of the same four terms (rounded up) to produce the resulting right endpoint. For the special case where the interval Y includes zero, X/Y is an exterior interval that is nevertheless contained in the interval R*.

Note that the result of any of these interval operations is the empty interval if either of the intervals, X or Y, are the empty interval. Also note, that in one embodiment of the present invention, extended interval operations never cause undefined outcomes, which are referred to as "exceptions" in the IEEE 754 standard.

Splitting an Interval Parameter

Figure 6:
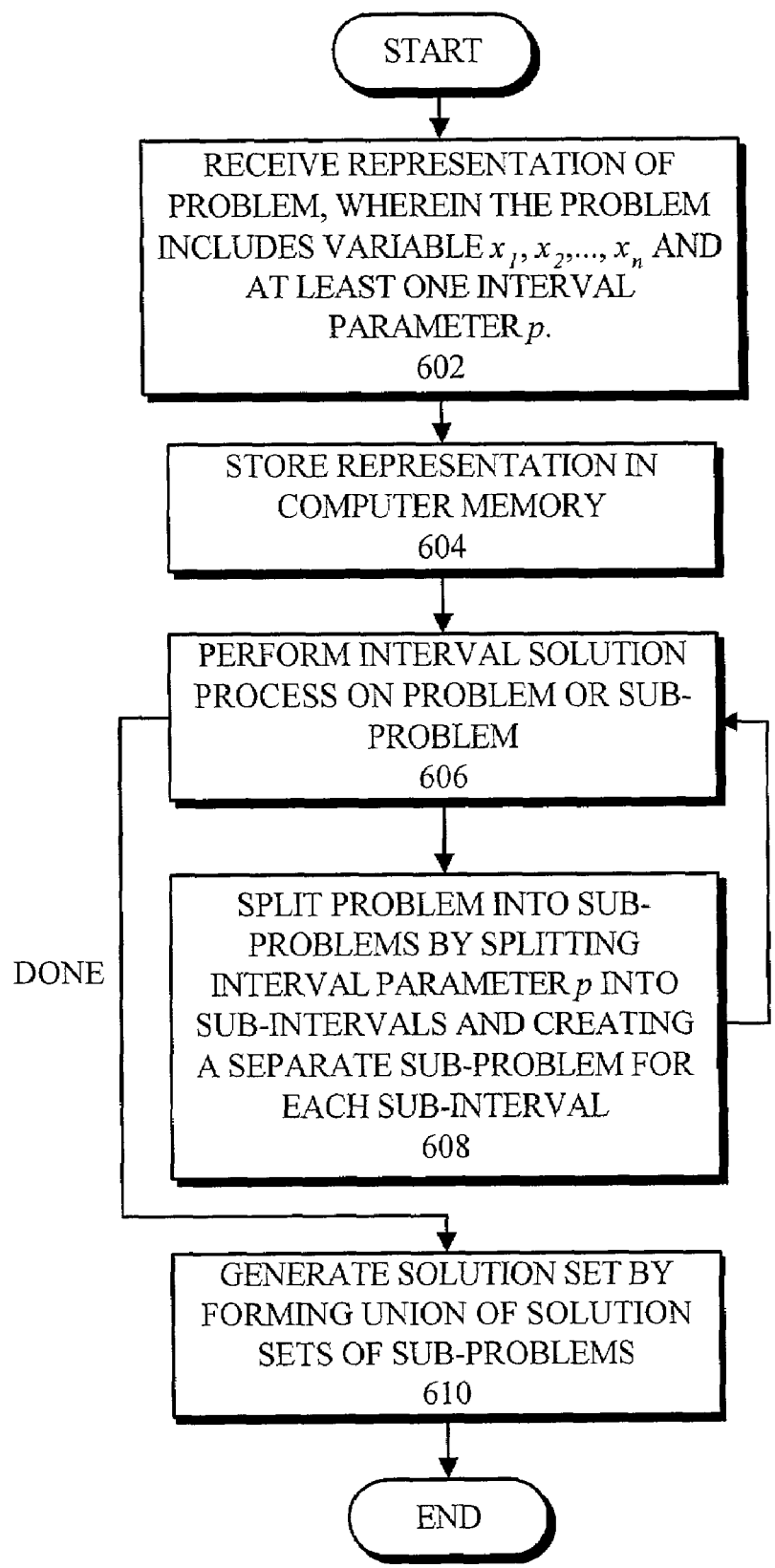
FIG. 6 is a flow chart illustrating how a solution process splits an interval parameter in accordance with an embodiment of the present invention.

FIG. 6 is a flow chart illustrating how a solution process splits an interval parameter in accordance with an embodiment of the present invention.

The system starts by receiving a representation of the problem, wherein the problem includes a number of variables $x_1, x_2, x_3, \ldots x_n$, and at least one interval parameters (step 602). The system then stores the problem in a computer system memory (step 604). Note that the solution set of the problem is contained within a box X that includes interval components for each of the variables $x_1, x_2, x_3, \ldots x_n$.

Next, the system performs an interval solution process on the problem (or sub-problem) (step 606). This interval solution process can generally include any type of solution process for an interval problem, such as a nonlinear global optimization problem or the problem of determining a solution set of a system of nonlinear equations.

Possible solution processes are described in more detail in the following patent applications, which are hereby incorporated by reference to disclose details of possible solution processes: (1) U.S. patent application Ser. No. 10/042,908 filed Jan. 8, 2002, entitled "Method and Apparatus for Solving Systems of Nonlinear Equations Using Interval Arithmetic," by inventors G. William Walster and Eldon R. Hansen; (2) U.S. patent application Ser. No. 10/042,909 filed Jan. 8, 2002, entitled "Method and Apparatus for Solving an Unconstrained Global Optimization Problem," by inventors G. William Walster and Eldon R. Hansen; (3) U.S. patent application Ser. No. 10/042,833 filed Jan. 8, 2002, entitled "Method and Apparatus for Solving an Inequality Constrained Global Optimization Problem," by inventors G. William Walster and Eldon R. Hansen; and (4) U.S. patent application Ser. No. 10/042,907 filed Jan. 8, 2002, entitled "Method and Apparatus for Solving an Equality Constrained Global Optimization Problem," by inventors G. William Walster and Eldon R. Hansen. Note that the above-referenced patent applications disclose many techniques, including the Newton method, to bound the solution set of a problem.

During this interval solution process, the system can split the problem into sub-problems by splitting the interval parameter p into subintervals, (e.g., $p_1$ and $p_2$) and by creating a separate sub-problem for each subinterval (step 608). In one embodiment of the present invention, this splitting takes place if the box X (or a subbox) is not sufficiently reduced by any of the above-referenced techniques. Note that the process of splitting the problem into sub-problems can additionally involve splitting the box X into subboxes.

The parameter p can be treated as a variable for purposes of splitting in the techniques described in the above-referenced patent applications. However, the parameter p cannot be used for other purposes involving variables. For example, in some cases the interval solution process may involve taking derivatives with respect to the variables $x_1, x_2, x_3, \ldots x_n$, but not with respect to the interval parameters. Taking a derivative with respect to an interval parameter makes no sense, because, for example, monotonicity with respect to a parameter is irrelevant.

After the splitting operation, the system returns to step 606 to perform the interval solution process on the newly generated sub-problems.

If no splitting takes place during the interval solution process in step 606, the system generates a solution set for the problem by forming the union of solution sets for all of the sub-problems (step 610).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for solving a problem through an interval solution process, comprising:
    receiving a representation of the problem, wherein the problem includes a number of variables $x_1, x_2, x_3, \ldots x_n$ and at least one interval parameter p, wherein the interval parameter p is an interval, wherein the interval parameter is distinct from the variables, wherein the problem is an interval global optimization problem, and wherein solving the interval global optimization problem involves splitting the interval parameter p as well as splitting boxes defined by the interval variables $x_1, x_2, x_3, \ldots x_n$, with respect to variables $x_1, x_2, x_3, \ldots x_n$, but not with respect to p;
    storing the representation in a computer memory; and
    performing the interval solution process on the problem within an arithmetic unit, which performs interval computations;
    wherein the interval solution process involves,
        splitting the problem into sub-problems by splitting the interval parameter p into subintervals, and creating a separate sub-problem for each subinterval, and
        performing the interval solution process on the sub-problems.

2. The method of claim 1,
    wherein the solution set of the problem is contained within a box X that includes interval components for each of the variables $x_1, x_2, x_3, \ldots x_n$; and
    wherein splitting the problem into sub-problems additionally involves splitting the box X into subboxes.

3. The method of claim 2, wherein performing the interval solution process on the box X involves:
    attempting to reduce the box X; and
    if box X is not sufficiently reduced, splitting the problem into sub-problems by splitting the box X and/or splitting the interval parameter p.

4. The method of claim 2, wherein performing the interval solution process can involve performing an interval Newton method on the box X.

5. The method of claim 1, wherein performing the interval solution process involves taking derivatives with respect to the variables $x_1, x_2, x_3, \ldots x_n$, but not with respect to the interval parameter p.

6. The method of claim 1, further comprising generating a solution set for the problem by forming a union of solutions of the sub-problems.

7. The method of claim 1, wherein performing the interval solution process on the sub-problems can additionally involve splitting the sub-problems.

8. The method of claim 1, wherein the problem involves solving a system of nonlinear equations.

9. A computer-readable storage medium storing instructions that when executed by a computer cause the computer to perform a method for solving a problem through an interval solution process, the method comprising:
    receiving a representation of the problem, wherein the problem includes a number of variables $x_1, x_2, x_3, \ldots x_n$ and at least one interval parameter p, wherein the interval parameter p is an interval, wherein the interval parameter is distinct from the variables, wherein the problem is an interval global optimization problem, and wherein solving the interval global optimization problem involves splitting the interval parameter p as well as splitting boxes defined by the interval variables $x_1, x_2, x_3, \ldots x_n$ with respect to variables $x_1, x_2, x_3, \ldots x_n$ but not with respect to p;
    storing the representation in a computer memory; and
    performing the interval solution process on the problem within an arithmetic unit, which performs interval computations;
    wherein the interval solution process involves,
        splitting the problem into sub-problems by splitting the interval parameter p into subintervals, and creating a separate sub-problem for each subinterval, and
        performing the interval solution process on the sub-problems.

10. The computer-readable storage medium of claim 9,
    wherein the solution set of the problem is contained within a box X that includes interval components for each of the variables $x_1, x_2, x_3, \ldots x_n$; and
    wherein splitting the problem into sub-problems additionally involves splitting the box X into subboxes.

11. The computer-readable storage medium of claim 10, wherein performing the interval solution process on the box X involves:
    attempting to reduce the box X; and
    if box X is not sufficiently reduced, splitting the problem into sub-problems by splitting the box X and/or splitting the interval parameter p.

12. The computer-readable storage medium of claim 10, wherein performing the interval solution process can involve performing an interval Newton method on the box X.

13. The computer-readable storage medium of claim 9, wherein performing the interval solution process involves taking derivatives with respect to the variables $x_1, x_2, x_3, \ldots x_n$, but not with respect to the interval parameter p.

14. The computer-readable storage medium of claim 9, wherein the method further comprises generating a solution set for the problem by forming a union of solutions of the sub-problems.

15. The computer-readable storage medium of claim 9, wherein performing the interval solution process on the sub-problems can additionally involve splitting the sub-problems.

16. The computer-readable storage medium of claim 9, wherein the problem involves solving a system of nonlinear equations.

17. An apparatus that solves a problem through an interval solution process, comprising:

a computer memory for storing a representation of the problem, wherein the problem includes a number of variables $x_1, x_2, x_3, \ldots x_n$ and at least one interval parameter p, wherein the interval parameter p is an interval, wherein the interval parameter is distinct from the variables, wherein the problem is an interval global optimization problem, and wherein solving the interval global optimization problem involves splitting the interval parameter p as well as splitting boxes defined by the interval variables $x_1, x_2, x_3, \ldots x_n$, with respect to variables $x_1, x_2, x_3, \ldots x_n$, but not with respect to p;

an arithmetic unit, which performs interval computations;

an interval solution mechanism within the arithmetic unit that is configured to, split the problem into sub-problems by, splitting the interval parameter p into subintervals, and creating a separate sub-problem for each subinterval, and to perform the interval solution process on the sub-problems.

18. The apparatus of claim 17, wherein the solution set of the problem is contained within a box X that includes interval components for each of the variables $x_1, x_2, x_3, \ldots x_n$; and wherein while splitting the problem into sub-problems, the interval solution mechanism is additionally configured to split the box X into subboxes.

19. The apparatus of claim 18, wherein interval solution mechanism is configured to:

attempt to reduce the box X; and if box X is not sufficiently reduced, to split the problem into sub-problems by splitting the box X and/or splitting the interval parameter p.

20. The apparatus of claim 18, wherein interval solution mechanism is configured to performing an interval Newton method on the box X.

21. The apparatus of claim 17, wherein interval solution mechanism is configured to take derivatives with respect to the variables $x_1, x_2, x_3, \ldots x_n$, but not with respect to the interval parameter p.

22. The apparatus of claim 17, wherein interval solution mechanism is configured to generate a solution set for the problem by forming a union of solutions of the sub-problems.

23. The apparatus of claim 17, wherein while performing the interval solution process on the sub-problems, the interval solution mechanism is configured to split the sub-problems.

24. The apparatus of claim 17, wherein the problem involves solving a system of nonlinear equations.

* * * * *

UNITED STATES PATENT AND TRADEMARK OFFICE
CERTIFICATE OF CORRECTION

PATENT NO. : 6,976,048 B2  
DATED : December 13, 2005  
INVENTOR(S) : G. William Walster et al.

Page 1 of 1

It is certified that error appears in the above-identified patent and that said Letters Patent is hereby corrected as shown below:

Title page,
Item [54], Title, should read -- METHOD AND APPARATUS FOR SOLVING PROBLEMS HAVING INTERVAL PARAMETERS --.

Signed and Sealed this

Fourteenth Day of February, 2006

JON W. DUDAS
*Director of the United States Patent and Trademark Office*